Nov. 9, 1954     W. McLAUGHLIN     2,693,667
METHOD OF BLOWING GLASS BOTTLES
Filed April 10, 1953     2 Sheets-Sheet 1

WILLIAM McLAUGHLIN
INVENTOR.

BY *Hazard & Miller*

ATTORNEYS

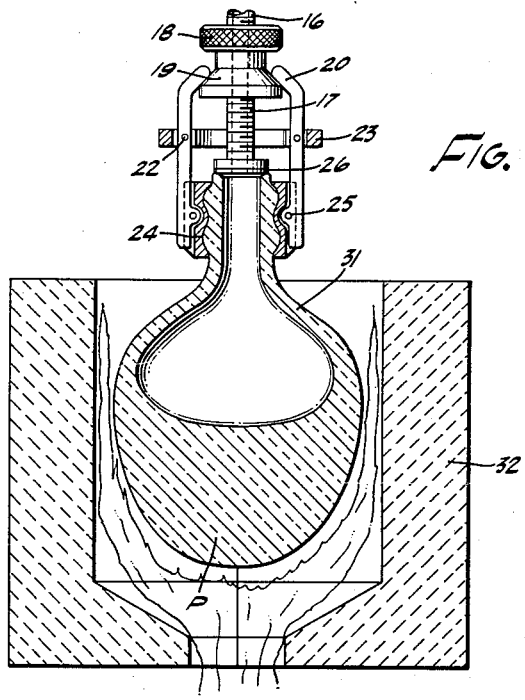
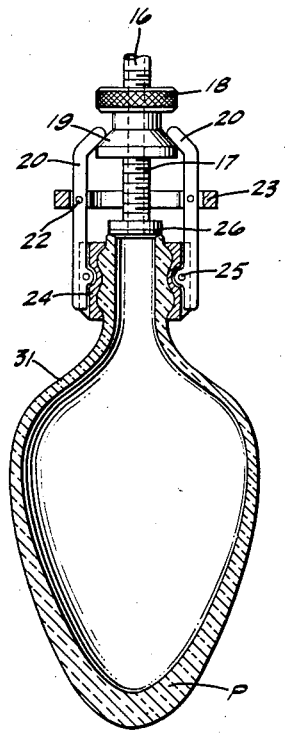
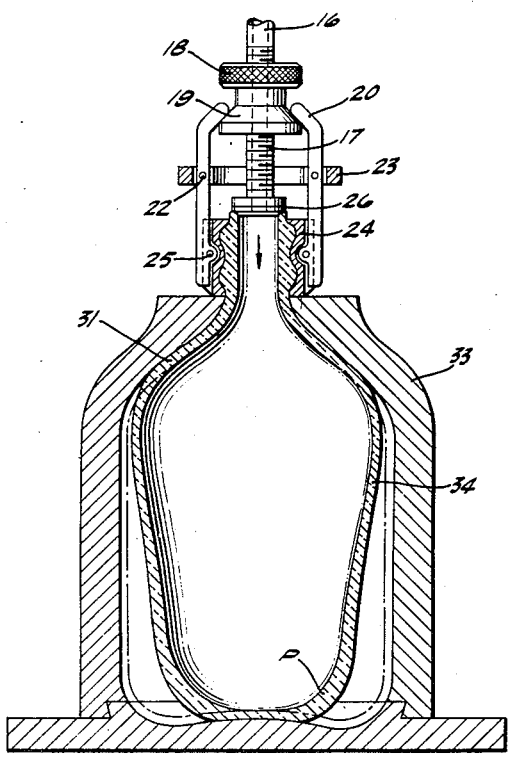

United States Patent Office 2,693,667
Patented Nov. 9, 1954

2,693,667

METHOD OF BLOWING GLASS BOTTLES

William McLaughlin, Gardena, Calif.

Application April 10, 1953, Serial No. 348,065

3 Claims. (Cl. 49—80)

This invention relates to improvements in blowing large glass bottles, demijohns, and the like, and is particularly useful in blowing narrow-necked glass containers such as five-gallon water bottles and thirteen-gallon demijohns.

The invention herein disclosed may be regarded as an improvement over the disclosure made in my copending application Serial No. 286,153, filed May 5, 1952, entitled "Method and Apparatus for Blowing Glass Bottles." This application has since become abandoned.

In the above mentioned application there is disclosed a method and apparatus wherein a parison is first formed in a combined parison and neck mold so arranged that the neck mold is openable in advance of the parison mold. When the parison is formed the neck mold forms and shapes the neck of the bottle or demijohn in its final form. As the wall thickness of the parison within the neck mold is relatively thin this portion of the parison quickly solidifies. It may become solid before the neck mold is open or the opening of the neck mold will quickly allow the neck portion of the parison to cool and quickly solidify. The solidified neck portion of the parison, which is thus given its final shape in the course of forming the parison, provides a portion to which a blow pipe is attachable through which the parison may be blown. It also provides a portion by which the parison may be handled or manipulated by means of the blow pipe in transferring the parison to a reheater and to a blow mold in which the parison is blown to its final shape below the neck.

The present invention contemplates forming the parison in a combined parison and neck mold wherein the neck mold is openable in advance of the parison mold and will shape the upper portion of the parison into the final form of the neck of the bottle or demijohn. This portion collects and solidifies into its final shape and forms a solidified portion by which the parison may be manipulated and through which the parison may be blown. The parison is then transferred to a reheater and after being reheated it is then transferred to a blank mold designed to shape the shoulders of the bottle or demijohn. After the shoulders have been given their final shape, or substantially so, by the blank mold the parison is again transferred to a reheater and the lower portion of the parison below the solidified shoulders is again reheated leaving the shoulders and the neck portion of the parison solid or substantially so. After the lower portion only of the parison has been reheated to render it sufficiently plastic for blowing the parison is transferred to a blow mold and the lower portion of the parison or that portion below the shoulders is completely blown. This formation of the shoulders of the bottle in the blank mold prior to the transfer of the parison to the blow mold results in several advantages in blowing large glass bottles and demijohns of the type referred to herein. One advantage resides in the fact that the wall thickness of the shoulders can be maintained adequately heavy.

Another advantage is that the glass that forms the vertical walls of the bottle beneath the shoulders will not tend to overlap the glass that is used to form the shoulders, forming objectionable "neckties."

With the foregoing and other objects in view, which will be made manifest in the following detailed description and specifically pointed out in the appended claims, reference is had to the accompanying drawings for an illustrative embodiment of the invention, wherein:

Fig. 4 is a vertical section illustrating the parison as having been transferred to a second reheater designed to reheat the lower portion of the parison only leaving the neck and shoulders in solidified condition or substantially so;

Fig. 5 is a vertical section illustrating the parison in the course of its transfer from the reheater shown in Fig. 4 to the blow mold; and Fig. 6 is a vertical section illustrating the parison in the course of its being blown in the blow mold.

Figure 1:
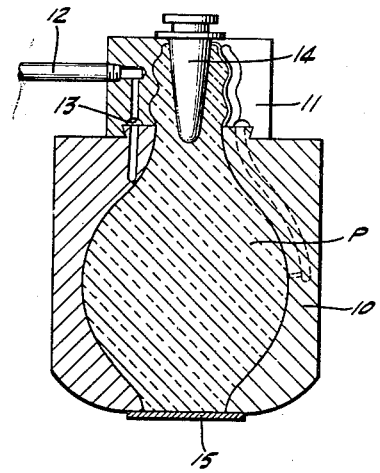
Figure 1 is a sectional view through a combined parison and neck mold illustrating the manner in which the parison is initially formed in accordance with the present invention.

Referring to the accompanying drawings wherein similar reference characters designate similar parts throughout, 10 indicates a parison mold over which there is disposed a neck mold 11. The parison mold 10 and the neck mold 11 are made of openable parts or halves in conformity with conventional practice. However, the combined parison and neck mold differ from the conventional combined parison and neck mold in that the neck mold 11 is so arranged with respect to the parison mold 10 that the neck mold 11 is openable in advance of the parison mold 10. The combined parison and neck mold are adapted to be introduced into a glass furnace and to have the parison P sucked up therein. A vacuum tube 12 is connected to the neck mold 11 and to various passages 13 in the neck mold and parison mold so that a partial vacuum can be created within the combined parison and neck mold to draw the glass that forms the parison up into the mold.

Figure 2:
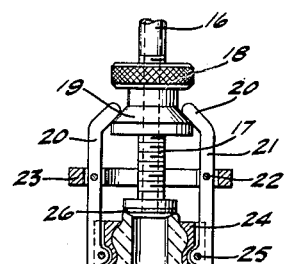
Fig. 2 is a vertical section illustrating the manner in which the parison, after its neck has solidified, is transferred to a reheater.

The top of the neck mold 11 is closed by a removable plunger 14 which cores out the top of the parison and cores out the mouth of the bottle or demijohn that is ultimately formed. As the combined mold is withdrawn from the glass furnace the bottom of the parison mold passes over a trimmer 15 which shears off the glass from the bottom of the parison. It will be observed that the walls of the parison surrounding the plunger 14 are relatively thin and consequently the glass that is within the the neck mold 11 quickly cools and solidifies. If this does not take place prior to the opening of the neck mold 11, the neck mold is open and the exposure of the upper portion of the parison causes it to quickly cool and solidify. The neck mold is so shaped as to impart to the upper portion of the parison its final formation and while the plunger 14 may not give to this upper portion of the parison its final form, it very nearly does so. This solidified neck on the parison enables a blow pipe to be attached thereto by which the parison may be subsequently blown and manipulated. When the neck mold 11 has been opened and the neck portion has solidified a blow pipe 16 is applied thereto. This blow pipe has a threaded lower end, indicated at 17, on which a nut 18 is rotatable. The nut has a coned portion 19 engageable with fingers 20 on levers 21 that are pivoted at 22 on a surrounding ring 23. The levers 21 have jaws 24 pivoted thereto as at 25. These jaws are designed to fit around the solidified neck portion of the parison. When the nut 18 is screwed upwardly on the blow pipe 16 the jaws 24 are caused to contract by means of the levers 21 about the solidified neck portion of the parison. The bottom of the blow pipe may be equipped with an asbestos washer 26 designed to engage the mouth of the parison and prevent the escape of air in the course of blowing. When the blow pipe 16 has been attached to the solidified neck of the parison the parison is transferred thereby to a reheater 27 as illustrated in Fig. 2. This reheater is so designed as to reheat the parison below the solidified neck but to leave the solidified neck in its solid condition.

Figure 3:
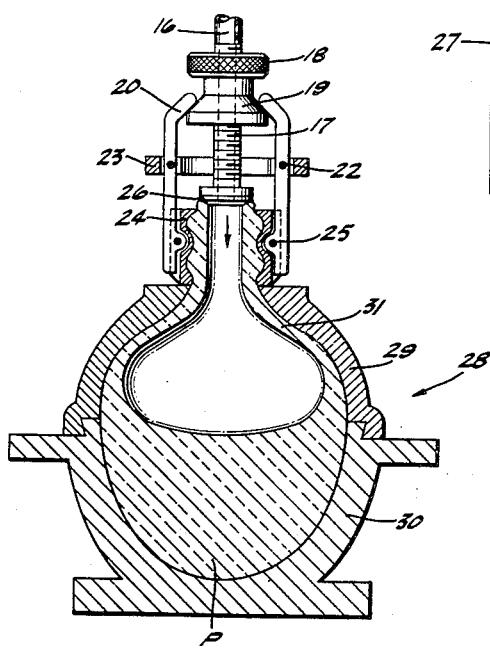
Fig. 3 is a vertical section illustrating the parison as having been introduced into a blank mold in which the parison is partially blown so as to form the shoulders of the bottle or demijohn.

When the parison has thus been reheated it is transferred to a blank mold 28, as shown in Fig. 3. This blank mold is preferably made of upper and lower parts, the upper part 29 being formed of two halves which are openable independently of the lower portion 30. The upper portion 29 may be regarded as a shoulder mold in that its interior is so shaped as to impart to the portion of the parison immediately below the neck the final shaping of the shoulders, or substantially so. While the parison is in the blank mold, compressed air is supplied through the blow pipe 16 and the parison is partially blown therein. In the course of blowing the shoulders 31 the lower portion of the parison is supported by the lower half of the blank mold so that the weight of the parison does not tend to excessively draw out or thin out these shoulders. Consequently the shoulders may be maintained of adequate thickness.

After the parison has been partially blown, as indicated in Fig. 3, it is transferred by means of the blow pipe 16 to a second reheater, illustrated at 32 on Fig. 4. This reheater preferably differs from the reheater shown in Fig. 2 in that its walls are vertical. Consequently they do not converge around the upper portion of the parison that is immediately beneath the neck. When the parison is in this reheater the intention is to heat the lower portion of the parison only, leaving the shoulders 31 which have been shaped in the blank mold 28 in their solidified condition.

When the parison has been reheated in the reheater 32 it is transferred by means of the blow pipe 16 to the blow mold 33. In the course of the transfer the parison tends to lengthen out somewhat, as is illustrated in Fig. 5, but as the shoulder portions 31 remain in their solidified condition, or substantially so, these portions are not unnecessarily thinned and serve to cause the glass to widen somewhat in the course of its lengthening. When the parison is thus transferred into the blow mold 33, compressed air is again supplied through the blow pipe 16 and the parison is completely blown to its final shape, after which it may be removed from the blow mold and transferred to the annealing oven.

As the shoulder portions 31 have solidified, or substantially so, prior to being transferred to the blow mold, there is little if any tendency of the wall portions 34 to crowd upwardly or to overlap the shoulder portions in the course of this final blowing operation causing objectionable neckties. Consequently there is no objectionable weakness at the juncture between the shoulder portions 31 and the wall portions 34. Furthermore, the shoulder portions, wall portions, and bottom of the bottle may be maintained at substantially uniform and adequate thickness.

From the above described method it will be appreciated that the bottle or demijohn is formed from a parison that is progressively shaped and solidified from the top of the parison downwardly, that is, the neck portion is first shaped by the neck mold 11 and is allowed to solidify so that the parison may be manipulated thereby. Secondly, the parison, after being reheated, is partially blown in the blank mold 28, forming the shoulders 31 which are allowed to solidify. After again being reheated without materially softening the formed shoulders 31 or the formed neck, the parison is finally transferred to the blow mold and is blown therein without materially altering or modifying the formed neck and formed shoulders. It will be found that the use of this method enables large bottles and demijohns to be easily and economically produced.

Various changes may be made in the steps of the method without departing from the spirit and scope of the invention as defined by the appended claims.

I claim:

1. The method of producing glass bottles, demijohns, and the like, which includes forming a parison in a combined parison and neck mold, opening the neck mold and allowing the neck portion of the parison to cool and solidify, transferring the parison by the solidified neck to a blank mold, blowing the parison in the blank mold to form the shoulders of the bottle to substantially their final form, reheating that portion of the parison below the shoulders until soft without materially softening the shoulder or neck portions, transferring the parison by the solidified neck to a blow mold, and blowing the reheated portion of parison below the shoulders in the blow mold to final form.

2. The method of producing glass bottles, demijohns, and the like, which includes forming a parison in a combined parison and neck mold, opening the neck mold, transferring the parison by means of the neck portion of the parison to a reheater, reheating that portion of the parison below the neck portion until soft without softening the neck portion, transferring the parison by the neck portion to a blank mold, blowing the reheated portion of the parison in the blank mold to form the shoulders of the bottle to substantially their final form, reheating the parison below the shoulders until soft without materially softening the shoulders or neck portion, transferring the parison to a blow mold and blowing the reheated portion of the parison below the shoulders in the blow mold to final form.

3. The method of producing large glass bottles, demijohns, and the like, having relatively small necks and relatively broad shoulders which includes forming a parison in a combined parison and neck mold, opening the neck mold, transferring the parison by means of the neck portion of the parison to a reheater, reheating the parison below the neck portion until soft without softening the neck portion, transferring the parison by the neck portion to a blank mold, blowing that portion of the parison below the neck in the blank mold to form the shoulders of the bottle to substantially their final form, reheating that portion of the parison below the shoulders until soft without materially softening the shoulders or neck portion, transferring the parison by the neck portion to a blow mold and blowing the reheated portion of the parison below the shoulders in the blow mold into final form.

References Cited in the file of this patent

UNITED STATES PATENTS

| Number | Name | Date |
|---|---|---|
| 500,841 | Atterbury | July 4, 1883 |
| 609,704 | Ripley | Aug. 23, 1898 |
| 760,150 | Richardson | May 17, 1904 |
| 1,080,372 | Schiller | Dec. 2, 1913 |
| 2,225,948 | Beatty | Dec. 24, 1940 |
| 2,512,781 | Stewart | June 27, 1950 |

FOREIGN PATENTS

| Number | Country | Date |
|---|---|---|
| 382/31 | Australia | Dec. 24, 1931 |
| 757,536 | France | Oct. 16, 1933 |